United States Patent [19]

Dietlein

[11] 4,097,061
[45] Jun. 27, 1978

[54] SKI INSERT FOR ANCHORING A SKI BINDING SCREW IN A SKI

[76] Inventor: Robert W. Dietlein, 2904 Harmony Pl., La Crescenta, Calif. 91214

[21] Appl. No.: 677,899

[22] Filed: Apr. 19, 1976

[51] Int. Cl.² .............................................. A63C 5/00
[52] U.S. Cl. ........................................ 280/607; 85/47
[58] Field of Search .............. 280/607, 636, 611, 633, 280/634, 623; 85/47

[56] References Cited

U.S. PATENT DOCUMENTS

| | | | |
|---|---|---|---|
| 2,738,698 | 3/1956 | Poupitch | 85/47 |
| 2,922,455 | 1/1960 | Braendel | 85/47 X |
| 3,260,150 | 7/1966 | Colman | 85/47 |
| 3,362,281 | 1/1968 | Finlay | 85/47 |
| 3,789,725 | 2/1974 | Lindstrom | 85/47 |
| 3,866,509 | 2/1975 | Kraus et al. | 85/47 X |
| 3,927,897 | 12/1975 | Olson et al. | 280/612 |

FOREIGN PATENT DOCUMENTS

| | | | |
|---|---|---|---|
| 1,345,704 | 4/1963 | France | 280/607 |
| 80,939 | 10/1952 | Norway | 280/607 |

Primary Examiner—Joseph F. Peters, Jr.
Assistant Examiner—Milton L. Smith
Attorney, Agent, or Firm—William W. Haefliger

[57] ABSTRACT

A ski insert for anchoring a ski binding screw in a ski comprises a tubular metallic body having internal and external threads, the external thread being interrupted at an end portion of the insert to form chisel cutting edges, and a space to receive cuttings.

3 Claims, 5 Drawing Figures

SKI INSERT FOR ANCHORING A SKI BINDING SCREW IN A SKI

BACKGROUND OF THE INVENTION

This invention relates generally to ski-bindings, and more particularly concerns methods of releasably retaining ski-bindings in position on skis.

There is a need for means enabling ready attachment and de-tachment of ski-bindings to and from skis. For example skiers may want to shift expensive bindings from one set of skis to another without drilling or other fitting operations, particularly at skiing sites. No way was known to my knowledge, prior to the present invention, to enable such ready attachment and de-tachment, with the unusual advantages in construction, mode of operation and results as are now provided.

SUMMARY OF THE INVENTION

Basically, the invention is embodied in an insert for ski insert binding screws, the insert comprising (a) a tubular metallic body having an axis and external and internal threads extending about said axis and along the body, (b) the external thread being locally interrupted along an arcuate locus intersecting at least three successive turns to form chisel cutting edges proximate one end of the body and adapted to cut into the ski material upon twisting of the insert into an opening in the ski, (c) the internal thread sized to receive a ski binding screw.

As will be seen, the external thread typically has opposite flanks tapering to a tip and defining an angle less than about 31° in axial radial planes; the interruptions of the turns subtend an angle or angles less than 90° about the insert axis; one turn edge typically has zero spacing from an axial radial plane and two adjacent turn edges have positive spacings from that plane, to define the arcuate locus; and the continuations of the turns are sharply angled relative to radii to provide space for ski material to relatively "approach" the chisel edges.

Also, the invention is directed to the combination of such an insert with a ski, binding, and hold down fastener, as will be seen.

These and other objects and advantages of the invention, as well as the details of an illustrative embodiment, will be more fully understood from the following description and drawings, in which:

DRAWING DESCRIPTION

DRAWING DESCRIPTION

Figure 1:
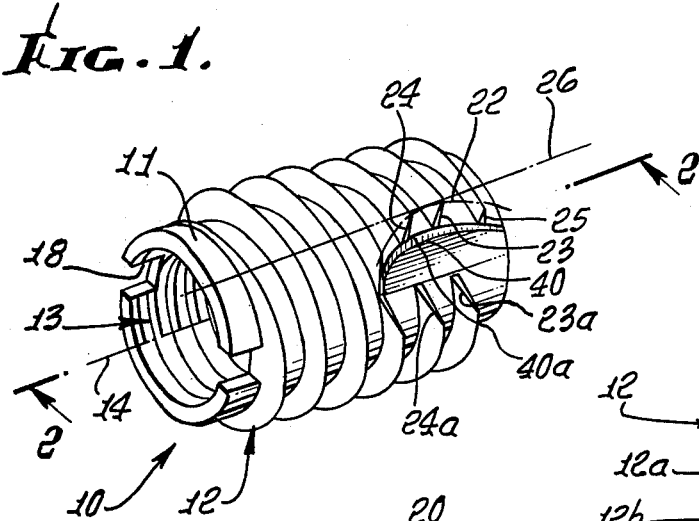
FIG. 1 is a perspective showing of an insert embodying the invention.
Figure 2:
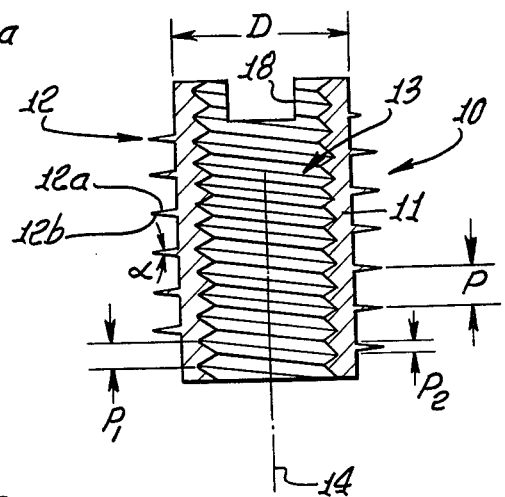
FIG. 2 is a section on lines 2—2 of FIG. 1, with the insert axis vertical.
Figure 3:
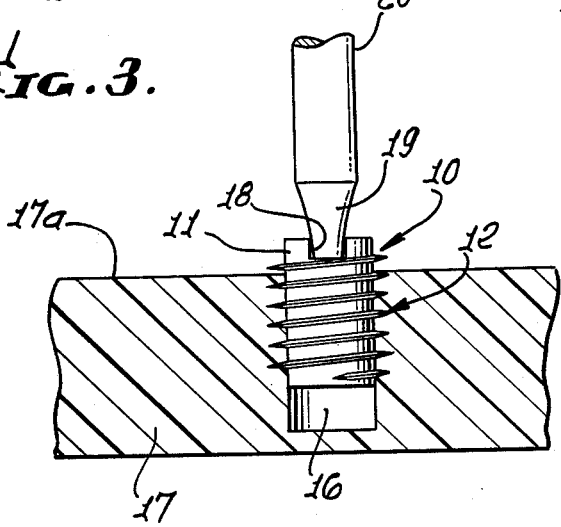
FIG. 3 is a vertical section showing twisting of an insert into a ski.

In FIGS. 1-3, the insert 10 comprises a tubular metallic body 11 having external and internal helical threads 12 and 13 extending about the body axis 14, and along the body. The pitch P of the external threads is typically substantially greater than pitch $P_1$ of the internal thread; also, the external thread is narrow, and typically the opposite flanks 12a and 12b define an angle $\alpha$ less than about 31° in axial radial planes facilitating self-tapping and threading into the ski material, as seen in FIG. 3.

As there shown, an opening 16 is drilled in the ski 17 from the top surface 17a, the diameter of the opening being about equal to diameter D of the insert body 11.

The upper end of the body 11 is notched at 18 to receive a tool such as tip 19 of a screw-driver 20, for exerting torque to effect self-tapping of the insert into the plastic, wood or other ski material.

In accordance with an important aspect of the invention, the external thread 12 is locally interrupted along an arcuate linear locus 22 intersecting at least three successive turns to form "chisel" cutting edges proximate an end of the body remote from notch 18. Such edges are well adapted to cut into the ski material about opening 16 upon twisting of the insert into the opening. In the example, one of the turn edges 23 has zero spacing from an axial radial plane 26 (which intersects that edge), and two adjacent edges have positive spacings from that plane. Thus, the adjacent edges 24 and 25 may be located at axially opposite sides of edge 23. Note that edges 23-25 extend generally radially relative to axis 14. The angular interruptions of the turns are less than 90°, as is clear from FIG. 1, and the edges of the continuations being shown at 23a-24a. The latter are flared away from edges 23-25 and sharply angled relative to radii intersecting them, providing space for ski material to "approach" chisel edges 23-25. Chisel edges 23-25 face in the right-handed or clockwise direction of insert rotation, as determined from the notched end of the insert. The body also defines a recess 40 sunk inwardly from the surface of same adjacent the roots of the interrupted threads that define chisel edges 23-25. The recess has an arcuate wall 40a parallel to locus 22, and the bottom wall of the recess extends from the surface near threads 23a-25a to the bottom of wall 40a. The recess collects cuttings as the insert penetrates the ski.

Figure 4:
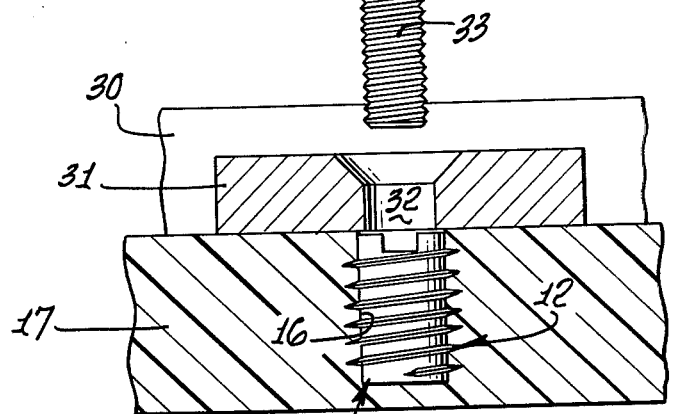
FIG. 4 is a view showing a ski binding being connected to a ski, using the insert to receive a fastener.
Figure 5:
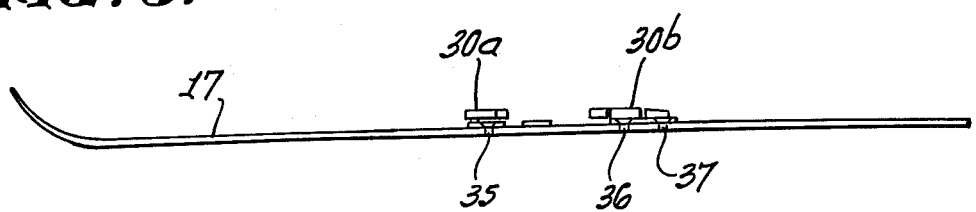
FIG. 5 shows a ski to which inserts may be connected.

FIG. 4 shows a ski-binding 30 having an ear 31 forming an opening 32 in axial alignment with the insert 10. A fastener 33 is adapted to be received through the opening 32 into the insert to threadably connect to internal thread 13. FIG. 5 shows the typical locations 35-37 of inserts in a ski to hold down binding elements 30a and 30b.

Referring again to FIG. 2, note that pitch spacing P is at least three times as great as the pitch $P_2$ of the thread 12 at its root.

The insert material should be hard enough to cut through any ski material. For example, the insert may consist of heat treatable steel.

Unusual advantages include the following:

(a) the insert greatly increases the pull-out resistance of the binding screws;

(b) the inserts may be used to repair skis where binding screws have pulled out;

(c) the inserts reduce theft of skis from auto racks if bindings are dismounted; and (d) auto racks can carry twice as many skis when bindings are dismounted, as enabled by use of the inserts.

I claim:

1. In combination with a ski, a ski insert for anchoring a ski binding screw, the insert comprising (a) a tubular metallic body having an axis and external and internal threads extending about said axis and along the body, the ski defining an opening into which said body is closely received, the external thread penetrating the ski about said opening, (b) the external thread being locally interrupted along an arcuate locus intersecting at least three successive turns to form three chisel cutting edges proximate one end of the body and adapted to cut into the ski material upon twisting of the insert into said opening in the ski, the external thread having opposite flanks defining an angle less than about 31° in axial radial planes, one of said cutting edges having zero spacing from an axial radial plane and two adjacent cutting edges at opposite sides of said one edge having positive spacings from said plane, there being a recess sunk in the body and having an arcuate side wall adjacent the roots of said three turns, said recess being shallow and having a bottom wall extending from said arcuate wall to the body surface near continuations of said turns, said bottom wall defining a plane generally tangent to terminals defined by said continuations, said recess sized to collect cuttings, the outermost radial dimension of said chisel edges and said continuations closest to said edges being the same as the outer radius of said external thread, said continuations being spaced from said chisel edges by the dimension of said interruptions, said continuations having edges which extend at sharp angles relative to intersecting radii from said axis, and relatively away from said chisel edges, the interruptions of said turns subtending angles substantially less than 90° about said axis, (c) the internal thread receiving a ski binding screw.

2. The insert of claim 1 wherein the body has an opposite end portion defining a notch to receive a tool for transmitting twisting torque to the insert.

3. The insert of claim 1 including a ski binding having an opening therethrough axially aligned with said insert axis, said screw received through said binding opening and threadably received into the insert internal thread.

* * * * *